(12) United States Patent
Ganfield

(10) Patent No.: US 7,240,166 B2
(45) Date of Patent: Jul. 3, 2007

(54) METHOD AND APPARATUS FOR IMPLEMENTING PACKET WORK AREA ACCESSES AND BUFFER SHARING

(75) Inventor: Paul Allen Ganfield, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 916 days.

(21) Appl. No.: 10/427,864

(22) Filed: May 1, 2003

(65) Prior Publication Data

US 2004/0218631 A1 Nov. 4, 2004

(51) Int. Cl.
*G06F 12/00* (2006.01)
*H04J 3/24* (2006.01)
(52) U.S. Cl. ..................... 711/147; 711/154
(58) Field of Classification Search ............. 711/100, 711/118, 154, 170, 147; 710/52; 709/230; 370/412, 474
See application file for complete search history.

(56) References Cited

U.S. PATENT DOCUMENTS 4,902,225 A * 2/1990 Lohn .................... 433/80
6,859,454 B1 * 2/2005 Bowes ................ 370/366
6,981,036 B1 * 12/2005 Hamada ............... 709/223

* cited by examiner

*Primary Examiner*—Tuan V. Thai
(74) *Attorney, Agent, or Firm*—Joan Pennington

(57) ABSTRACT

A mapping area including a packet work area and a corresponding set of packet segment registers are provided. A packet segment register is loaded with a Packet ID (PID) and a packet translation unit maps packet data into the corresponding packet work area. Packets include one or more data buffers. Data buffers are chained together using a corresponding buffer descriptor for each data buffer. Each buffer descriptor points to the corresponding data buffer and to a next buffer descriptor. Each buffer descriptor includes an offset for a next packet data. A translate address is compared to the offset of each buffer descriptor to identify the data buffer containing the translate address. A buffer sharing counter (BSC) is allocated for a shared data buffer. Each buffer descriptor pointing to the shared data includes a pointer to the buffer sharing counter (BSC).

20 Claims, 9 Drawing Sheets

PACKET STRUCTURE - PHYSICAL

PACKET C BUFFER DESCRIPTOR ENTRIES 704, 706, 708 IN
BUFFER DESCRIPTOR (BD) CACHE 710

| BUFFER DESCRIPTOR POINTERS 520, 522 | | LENGTH 523 | OFFSET 524 | HEADER INFO 526 |
|---|---|---|---|---|
| Addr=800x | Next=57 | 256 | 256 | ID=12, L=479 |
| Addr=900x | Next=21 | 204 | 460 | |
| Addr=A00x | Next=NULL | 19 | 479 | |

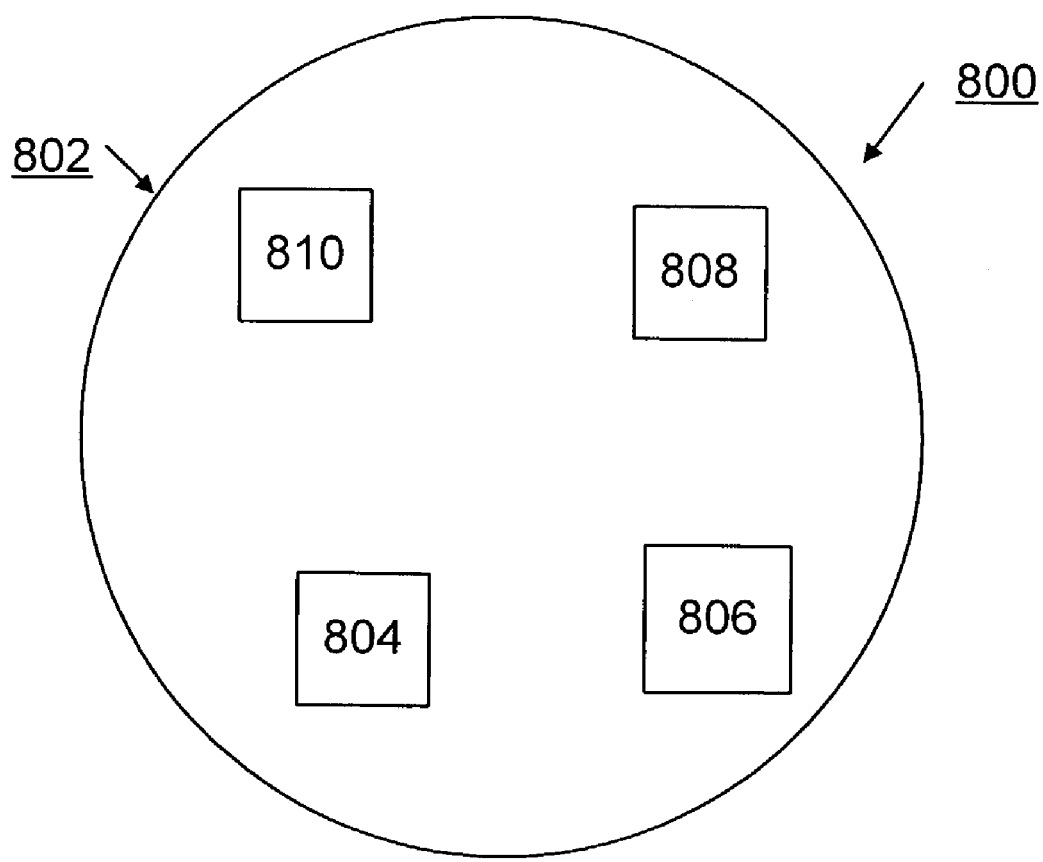

METHOD AND APPARATUS FOR IMPLEMENTING PACKET WORK AREA ACCESSES AND BUFFER SHARING

FIELD OF THE INVENTION

The present invention relates generally to the data processing field, and more particularly, relates to a method, apparatus and computer program product for implementing packet work area accesses and buffer sharing.

RELATED APPLICATIONS

Related United States patent applications assigned to the present assignee are being filed on the same day as the present patent application including:

U.S. patent application Ser. No. 10/427,886, by Kent Harold Haselhorst, Kerry Christopher Imming, and John David Irish, and entitled "METHOD AND APPARATUS FOR IMPLEMENTING VIRTUAL PACKET STORAGE VIA PACKET WORK AREA"; and U.S. patent application Ser. No. 10/427,865, by Paul Allen Ganfield, Kent Harold Haselhorst, Kerry Christopher Imming, and John David Irish, and entitled "METHOD AND APPARATUS FOR IMPLEMENTING PACKET COMMAND INSTRUCTIONS FOR NETWORK PROCESSING".

DESCRIPTION OF THE RELATED ART

One of the main functions of a network processor is to take incoming packets or frames, and perform manipulations or alterations on the headers and payloads for the purpose of implementing certain network protocols as required by a particular application. These operations can be done in the core processor but results in a user application that is tightly coupled to a specific network processor implementation. Since these operations may involve the manipulation of multiple data structures, many processor instructions are involved to complete. As a result, these operations consume a significant portion of the available processing power.

A need exists for an improved mechanism for implementing network processing. A need exits for such a mechanism that enables higher performance, minimizing required processor operations. A need exists for a mechanism for implementing packet work area accesses and buffer sharing with mapping packet data into a processor's address space.

SUMMARY OF THE INVENTION

A principal object of the present invention is to provide a method, apparatus and computer program product for implementing packet work area accesses and buffer sharing. Other important objects of the present invention are to provide such method, apparatus and computer program product for implementing packet work area accesses and buffer sharing substantially without negative effect and that overcome many of the disadvantages of prior art arrangements.

In brief, a method, apparatus and computer program product are provided for implementing packet work area accesses and buffer sharing. A mapping area including a packet work area and a corresponding set of packet segment registers are provided. A packet segment register is loaded with a Packet ID (PID) and a packet translation unit maps packet data into the corresponding packet work area. Packets include one or more data buffers. Data buffers are chained together using a corresponding buffer descriptor for each data buffer. Each buffer descriptor points to the corresponding data buffer and to a next buffer descriptor. Each buffer descriptor includes a length of the corresponding data buffer used to calculate an offset for a next packet data. A translate address is compared to the calculated offset to identify the data buffer containing the translate address.

In accordance with features of the invention, the starting offset of the identified data buffer is subtracted from the translate address to identify a target byte. A buffer sharing counter (BSC) is allocated for a shared data buffer. Each buffer descriptor pointing to the shared data buffer includes a pointer to the buffer sharing counter (BSC). When a packet with the packet buffer descriptor pointing to the shared data is discarded, the counter value of the BSC is decremented. The shared data buffer is discarded when the BSC has a zero value and the BSC is deallocated.

BRIEF DESCRIPTION OF THE DRAWINGS

The present invention together with the above and other objects and advantages may best be understood from the following detailed description of the preferred embodiments of the invention illustrated in the drawings, wherein:

FIG. 8 is a block diagram illustrating a computer program product in accordance with the preferred embodiment.

DETAILED DESCRIPTION OF THE PREFERRED EMBODIMENTS

Figure 1:
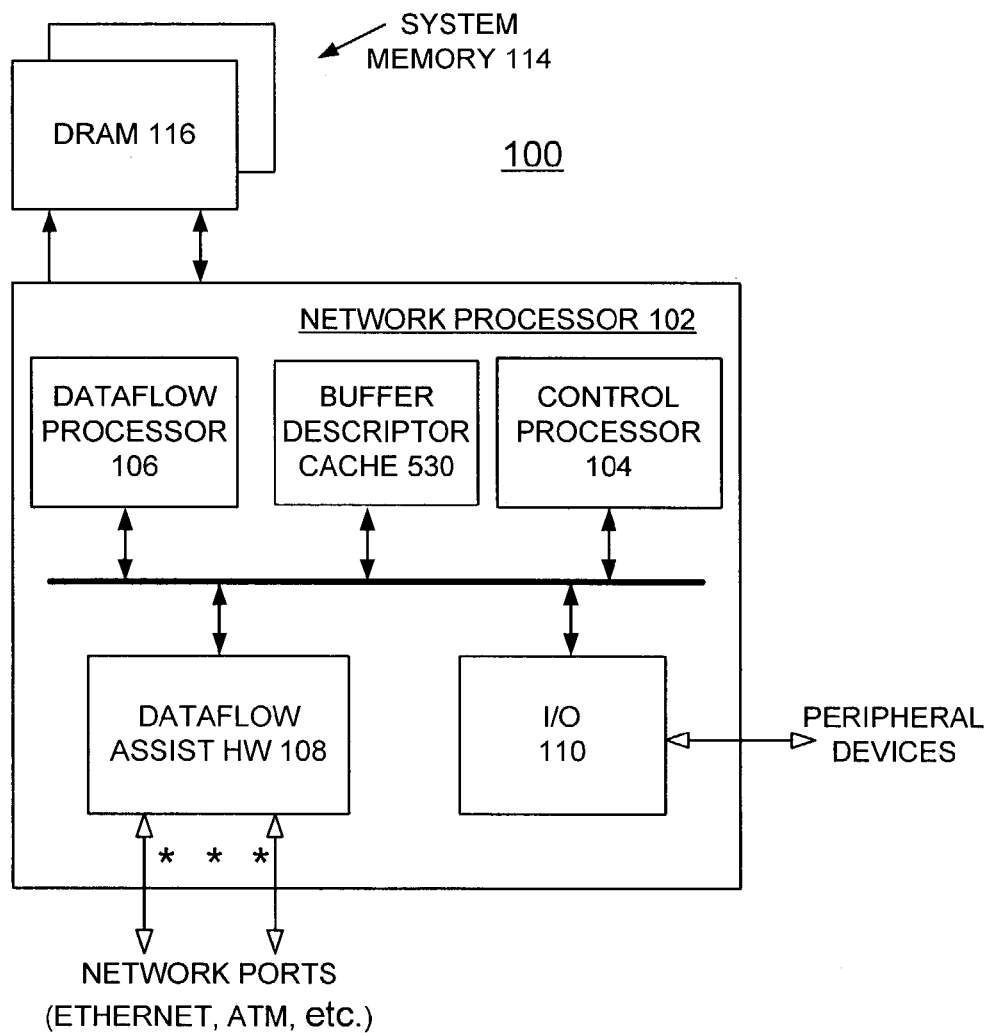
FIG. 1 is a block diagram representation illustrating a network processor system for implementing packet work area accesses and buffer sharing in accordance with the preferred embodiment.

Having reference now to the drawings, in FIG. 1, there is shown a network processor system generally designated by the reference character 100 for carrying out methods for implementing virtual packet storage via packet work area of the preferred embodiment. As shown in FIG. 1, network processor system 100 includes a network processor 102 coupled to multiple network ports for communicating using known network protocols, such as, an Asynchronous Transfer Mode (ATM), Ethernet, and the like. Network processor 102 includes a control processor 104 and a dataflow processor 106 coupled by a network processor bus to dataflow assist hardware (HW) 108 coupled to the network ports and an input/output (I/O) 110 coupled to peripheral devices. Network processor 102 includes a buffer descriptor cache 530 coupled to the control processor 104 and the dataflow processor 106 that is illustrated and described with respect to FIG. 5B. Network processor system 100 includes a system memory 114 including a dynamic random access memory (DRAM) 116 containing multiple banks for quick storage of data and access to that data.

Network processor 102 can be implemented with various standard processors, for example, with one of the PowerPC® line of processors manufactured by International Business Machines Corporation.

Figure 2:
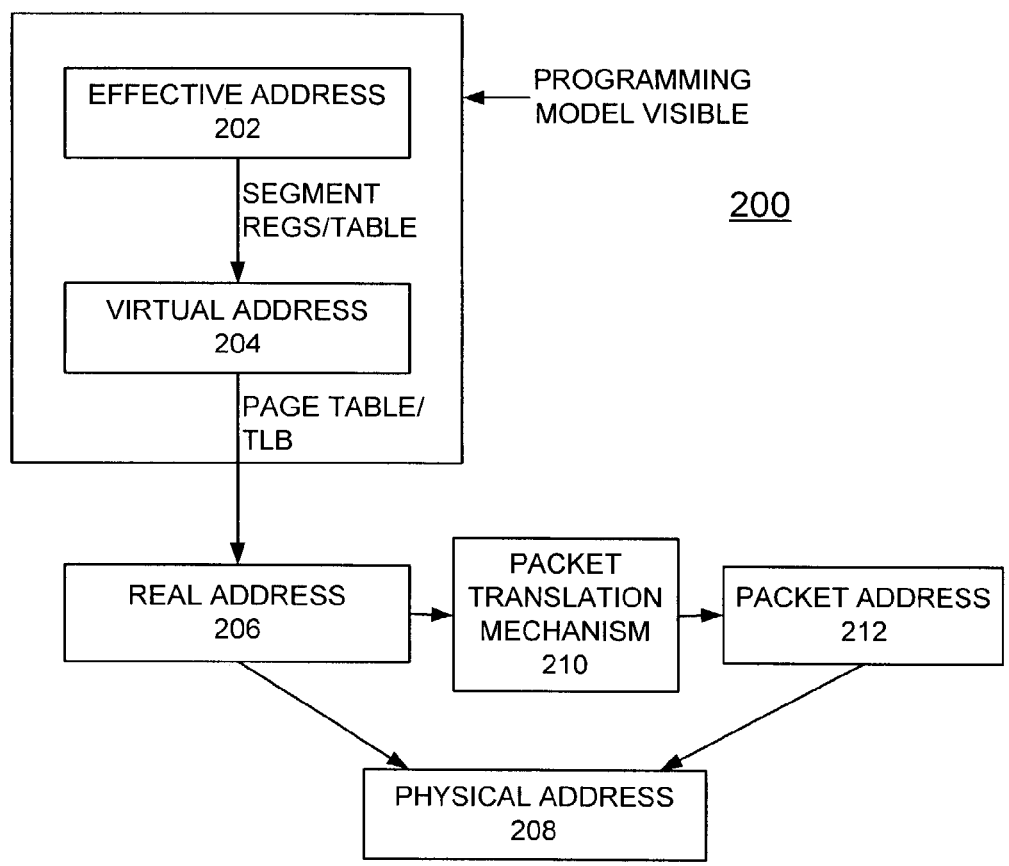
FIG. 2 is a block diagram representation illustrating a packet translation unit in accordance with the preferred embodiment.

Referring now to FIG. 2, there is shown a packet translation unit generally designated by the reference character 200 in accordance with the preferred embodiment. In the packet translation unit 200, an effective or logical address is received as indicated in a block 202. The effective address 202 is translated to a virtual address 204 using segment registers or table as indicated in a line labeled SEGMENT REGS/TABLE.

The virtual address 204 is translated into a real address as indicated in a block 206 and the result is saved in a translation look aside buffer (TLB) and all current mappings of virtual to real addresses are stored as entries in a page table in system memory as indicated in a line labeled PAGE TABLE/TLB. Real address 206 is translated into a physical address as indicated in a block 208.

A packet translation mechanism as indicated in a block 210 of the preferred embodiment maps the real address 206 for a packet to a packet address 212. A Packet Work Area (PWA) address of the preferred embodiment is translated into the packet address or packet address register (PAR) 212 as illustrated and described with respect to FIGS. 5A and 5B. The Packet Work Area (PWA) is illustrated and described with respect to FIGS. 3 and 4. The packet address 212 is mapped into the physical address 208.

Figure 3:
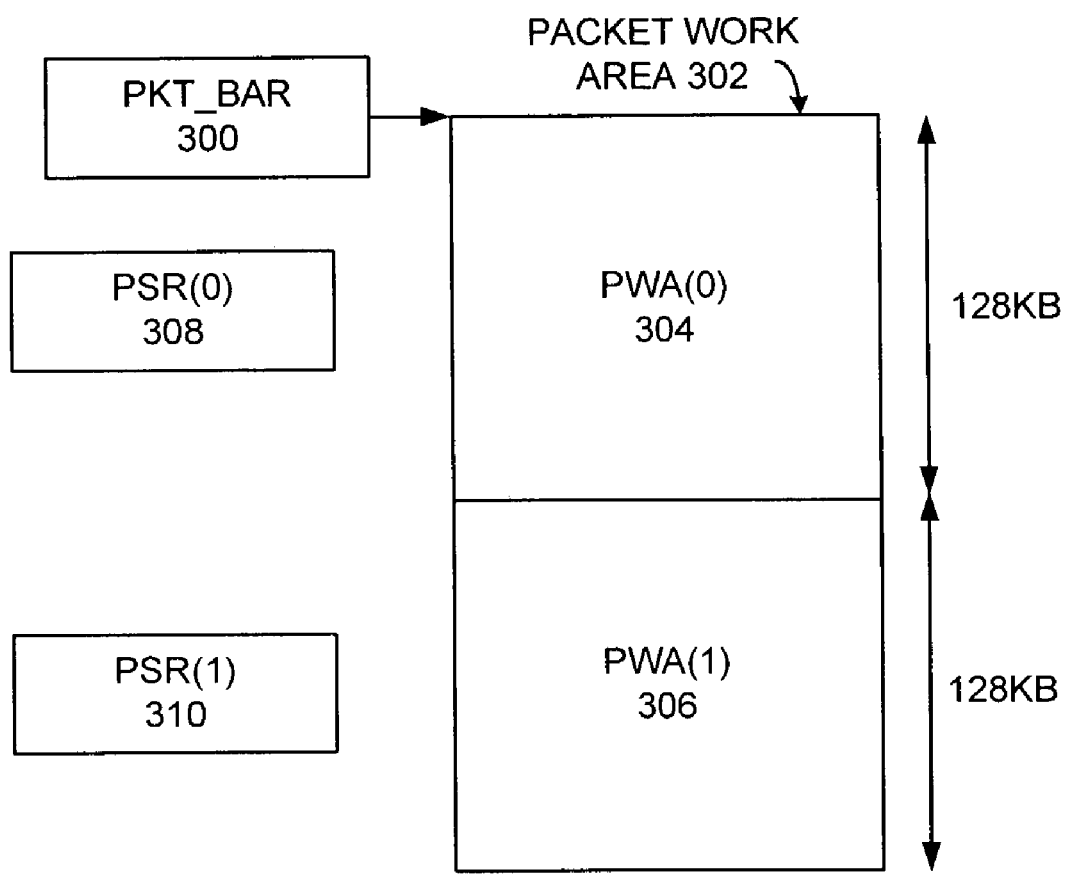
FIG. 3 is a block diagram representation illustrating a packet work area (PWA) and a corresponding set of packet segment registers (PSRs) of the packet translation unit of FIG. 2 in accordance with the preferred embodiment.

Referring now to FIG. 3, the packet translation mechanism 210 includes a packet base address register as indicated in a block PKT_BAR 300 defining an area of system address space where a packet work area (PWA) 302 is located. A set of Packet Work Areas PWA (0) 304, PWA (1) 306 and a corresponding set of packet segment registers (PSRs) 308, 310 are included in the packet translation mechanism 210 in accordance with the preferred embodiment.

A packet ID is loaded into a PSR (0) 308 or PSR (1) 310, to map the requested packet data into the corresponding PWA (0) 304 or PWA (1) 306. Each PWA (0) 304, PWA (1) 306 includes, for example, 128 KB area of system address space.

Packet translation unit 200 redirects loads and stores of the PWA (0) 304, PWA (1) 306 into the correct data buffer or buffers in system memory 114 using the real packet address stored in PAR 212 that is mapped to provide the physical address 208. The PWA 302 allows software to access packet data without concern for the details of the hardware buffer sizes or hardware allocation mechanism.

Figure 4:
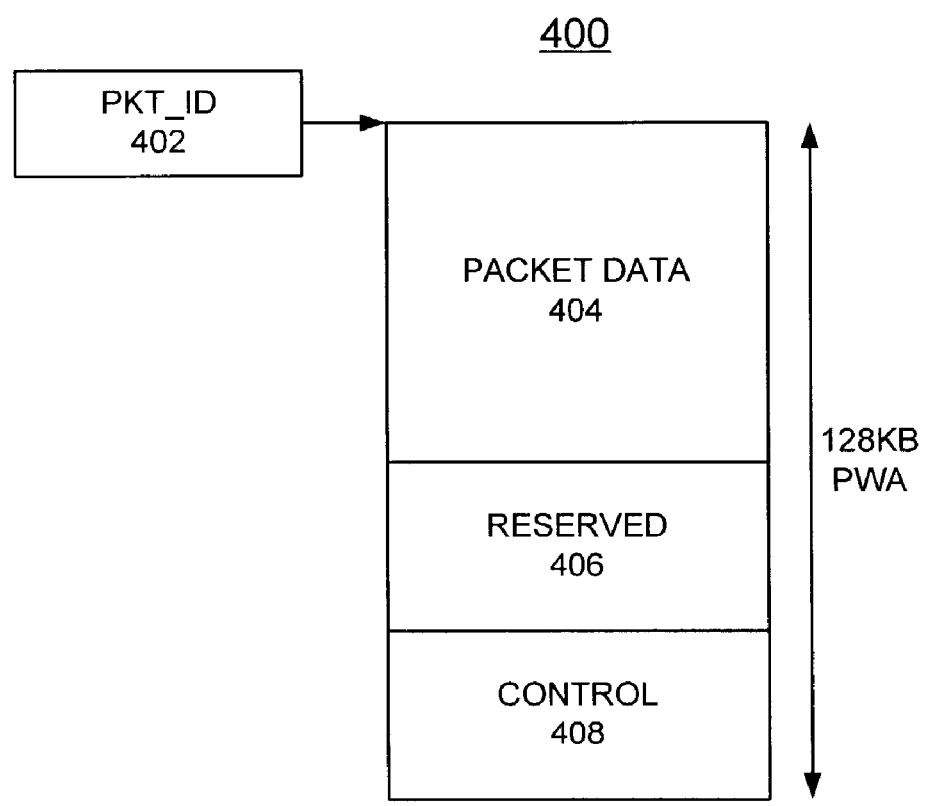
FIG. 4 is a block diagram representation illustrating a logical packet structure with a corresponding packet ID of the packet translation unit of FIG. 2 in accordance with the preferred embodiment.

FIG. 4 illustrates a logical packet structure generally designated by the reference character 400 in accordance with the preferred embodiment. A packet ID 402 used by the packet translation mechanism 210 points to PWA (0) 304 or PWA (1) 306 of the PWA 302 of FIG. 2. The logical packet structure 400 includes packet data 404, a reserved area 406, and packet control 408.

Figure 5A:
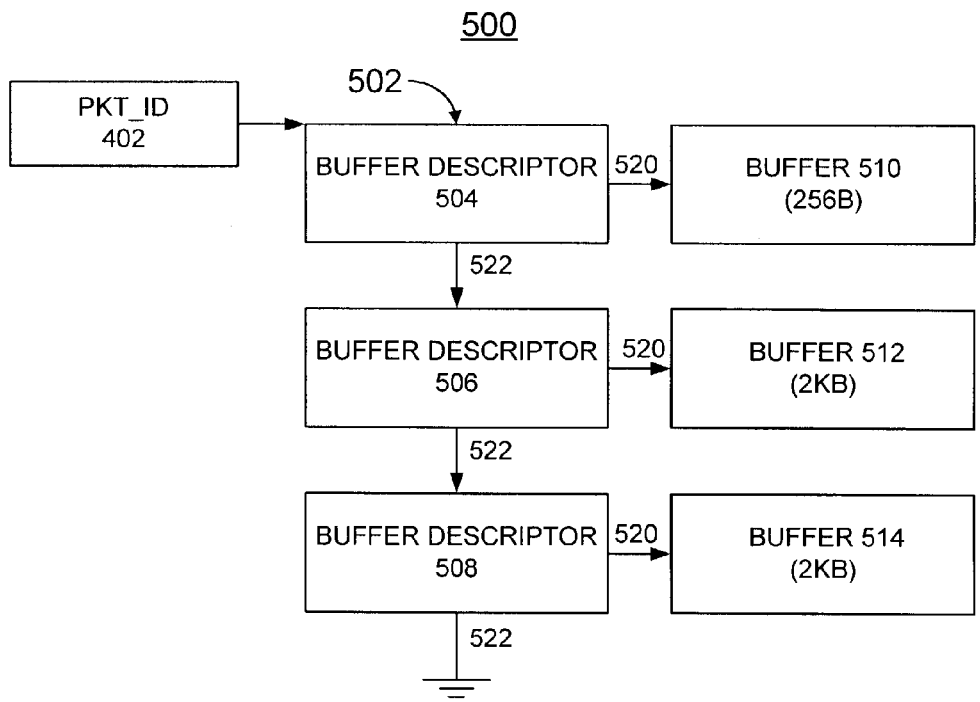
FIG. 5A is a block diagram representation illustrating an exemplary physical packet structure of the packet translation unit of FIG. 2 in accordance with the preferred embodiment.
Figure 5B:
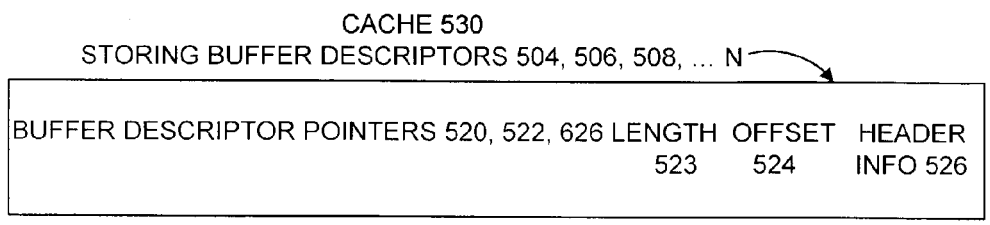
FIG. 5B is a block diagram representation illustrating a cache containing buffer descriptors of the physical packet structure of FIG. 5A in accordance with the preferred embodiment.

Referring now to FIGS. 5A and 5B, an exemplary physical packet structure generally designated by the reference character 500 in accordance with the preferred embodiment is illustrated in FIG. 5A. The packet ID 402 points to a chain 502 of buffer descriptors 504, 506, 508 respectively pointing to a respective buffer 510, 512, and 514 with a pointer indicated at a respective line 520. As shown, buffer descriptor 504 points to a first buffer 510, such as a 256 byte buffer. Buffer descriptor 506 points to a buffer 512, such as a 2 Kbyte buffer. Buffer descriptor 508 points to a buffer 514, such as a 2 Kbyte buffer. Buffer descriptors 504, 506, 508 respectively point to a next buffer descriptor with a pointer indicated at a respective line 522.

Referring to FIG. 5B, there is shown an exemplary buffer descriptor cache generally designated by reference character 530 for storing each of the buffer descriptors 504, 506, 508. The buffer descriptor cache 530 is created to hold a number N of buffer descriptors on-chip of the network processor system 100. Each of the buffer descriptors 504, 506, 508 contains the buffer descriptor pointers 520, 522, and a length 523 of the corresponding respective buffer 510, 512, and 514. An offset 524 that equals an offset into the packet is calculated for the respective buffers 510, 512, 514 using length 523. Cache 530 contains packet header information 526 including ID and length L of the packet. The first buffer descriptor 504 is read into the buffer descriptor cache 530 when the packet is loaded into the PWA, and the additional buffer descriptors 506, 508 are read in as needed. The offset 524 of the start of the first buffer 510 is 0. The offset 524 into the packet of the second buffer 512 is the length 523 of the first packet buffer 510. The offset 524 into the packet of the next packet buffer is the sum of the previous offset 524 and buffer length 523.

For example, the offset 524 associated with buffer descriptor 504 into the packet of the second buffer 512 is the length 523 of the first packet buffer 510. The offset 524 associated with buffer descriptor 506 into the packet of the next packet buffer 514 is the sum of the previous offset 524 associated with buffer descriptor 504 and the buffer length 523 of buffer 512. The offset 524 associated with buffer descriptor 508 is the sum of the previous offset 524 associated with buffer descriptor 506 and the buffer length 523 of buffer 514.

As each buffer descriptor 504, 506 is read in, the length 523 of the respective buffer 510, 512 is added to the starting offset 524 associated with respective buffer 510, 512 to get the offset 524 into the packet of the next buffer. At any point in time, the offset 524 associated with each on-chip buffer 510, 512 and the first buffer, for example, buffer 514 that has not been read in are known.

An address in the PWA 302 is an offset into the packet and is translated to a real address to complete the PWA operation. A set of parallel compares are performed of an offset to translate against these starting offsets 524 to determine which buffer 510, 512, 514 contains the desired translate offset. Performing the parallel compares of the preferred embodiment avoids the need for walking the buffer descriptor chain 502 for each offset and is faster. For example, assume that buffer 514 contains the desired translate offset. Then, for example, subtracting the starting offset 524 of the buffer 514 from the desired translate offset gives the offset within the buffer 514, called the target byte. The next cycle the buffer descriptor 508 is read from cache 530, and the target byte is added to the address to give the translated real address, and it is subtracted from the buffer length to give the amount of the buffer left at the translated address. If the PWA operation is longer than this, it crosses a buffer, and the next buffer descriptor is read from the cache 530 to get the next real address.

If in the first part of the translate, the translate offset is larger than the offset of the start of the first off-chip buffer, that off-chip buffer descriptor is read into the cache 530. If there are no more buffer descriptors in the packet, the translate offset is larger than the packet. Additional buffers could be allocated at that point to extend the packet. If the on-chip cache 530 is full, the last buffer descriptor slot N of the cache becomes a holding place for the overflow buffer descriptor that is read in. There is no limit to the number of buffers in a packet, so reading past a certain point in these packets causes buffer descriptors to be read in one at a time. The last overflow descriptor remains on-chip so the next translate can use the last overflow descriptor if the next translate hits that same buffer overflow descriptor. This allows sequential PWA accesses to only read buffer descriptors once. The first few buffer descriptors are not removed by the overflow buffer descriptor, so accesses to the earlier part of the packet are not impacted.

A set of commands or instructions is provided for manipulating packet data within network processor 102 as disclosed in the above-identified patent application entitled METHOD AND APPARATUS FOR IMPLEMENTING PACKET COMMAND INSTRUCTIONS FOR NETWORK PROCESSING. The subject matter of the above-identified patent application is incorporated herein by reference.

The packet length is included in data that can be accessed by the control processor 104 and the dataflow processor 106 that can also be accessed by the translate logic 200 used for processing packet commands. Specifically, the packet control block (PCB) contains the length (L) of the packet, which is needed by certain packet commands. The memory access needed by a packet command can be saved if the processor 106 accesses the data before the packet command.

Whenever the processor 106 reads or writes the PCB, the packet length L is captured from the data bus and saved in buffer descriptor cache 530 in the header information 526 for use by later packet commands. The packet command will have to fetch the packet length L from memory only if it is not already present in the buffer descriptor cache 530. Stores are also deferred, so the store to memory can be saved if the processor accesses the length after that. If the length in the data area is dirty, it will be substituted on a PCB fetch by the processor 106. If the processor 106 then stores the PCB, the stored value will be saved again and it will be clean, saving a store later.

In accordance with features of the preferred embodiment, a buffer sharing counter is provided to enable two or more packets to share a buffer. For example, the packet manipulation commands include commands that can split a packet into two packets.

In accordance with features of the preferred embodiment, buffer pointers are adjusted in buffer descriptors to point to the data in the new packet for the split operation, so that data does not need to be copied or moved, resulting in two packets pointing to the same buffer. The buffer sharing counter enables the shared packet data to be maintained until the last packet using the shared packet data is discarded.

Figure 6A:
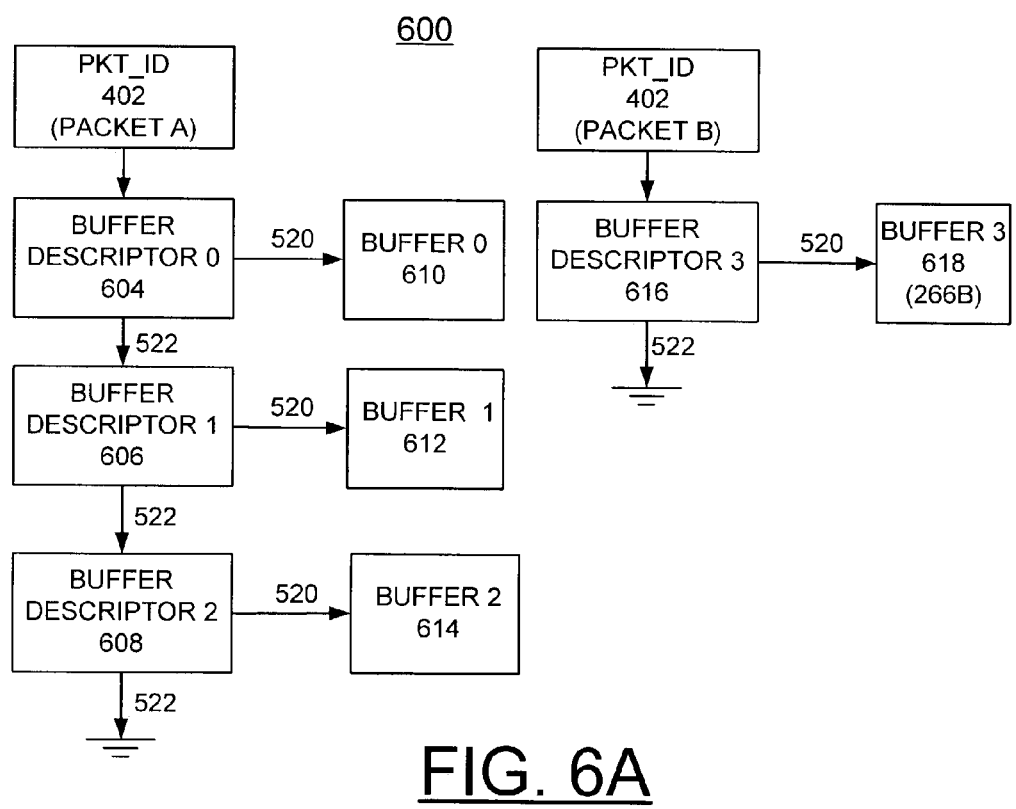
FIG. 6A is a block diagram representation illustrating exemplary physical packet structures for two example packets in accordance with the preferred embodiment.
Figure 6B:
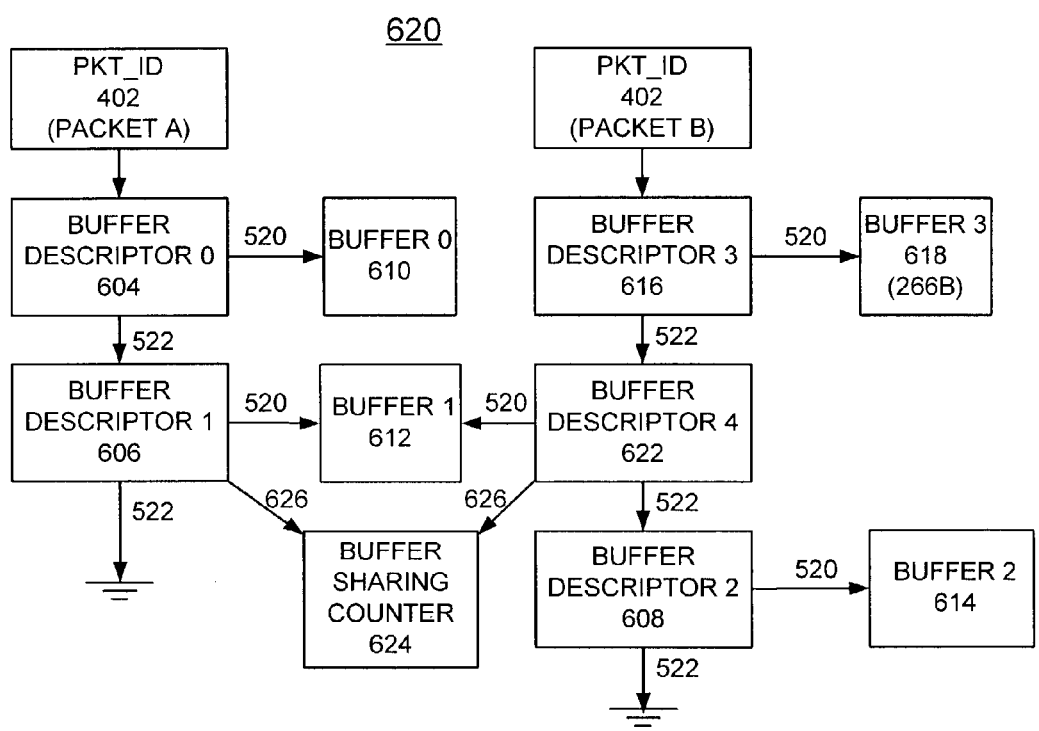
FIG. 6B is a block diagram representation illustrating exemplary physical packet structures for two example packets of FIG. 6A following a split operation in accordance with the preferred embodiment.

Referring now to FIGS. 6A and 6B, FIG. 6A illustrates exemplary physical packet structures for two example packets A and B generally designated by reference character 600 in accordance with the preferred embodiment. FIG. 6B illustrates exemplary physical packet structures generally designated by reference character 620 for the two example packets A and B following a split operation in accordance with the preferred embodiment.

As shown in FIG. 6A, the illustrated packet A includes a plurality of buffer descriptors 0, 604; 1, 606; 2, 608 each pointing to a respective data buffer 0, 610; 1, 612; 2, 614 indicated at a respective line 520. Each buffer descriptor 0, 604; 1, 606; 2, 608 points to the next buffer descriptor buffers 1, 612; 2, 614; null indicated at respective line 522. Packet B includes one buffer descriptor 616 pointing to a data buffer 3, 616 and pointing to the next buffer descriptor buffer null.

In general a packet split command causes a buffer to be split. FIG. 6B illustrates packet A split in the middle of buffer 1, 612 and the second half appended to packet B.

As shown in FIG. 6B following the packet split, the pointer 522 of buffer descriptor 3, 616 points to a new buffer descriptor 4, 622 added to packet B. New buffer descriptor 4, 622 of packet B points to the buffer 1, 612 now shared with packet A. Buffer descriptor 1, 606 of packet A points to the shared buffer 1, 612. New buffer descriptor 4, 622 points to buffer descriptor 2, 608 of packet B. Buffer descriptor 2, 608 points to buffer 2, 614 now appended to packet B. In accordance with features of the preferred embodiment, the buffer pointers 520 are adjusted to point to the data in the new packet B for the split operation, so that data does not need to be copied or moved, resulting in two packets pointing to the same buffer.

When one of the packet A or B is discarded, the shared buffer 1, 612 should not be discarded until the last packet A or B using the shared buffer is discarded. A buffer sharing counter (BSC) 624 of the preferred embodiment is allocated for each shared buffer, such as shared buffer 1, 612. Buffer descriptor 1, 606 of packet A and buffer descriptor 4, 622 of packet B include a pointer respectively indicated at line 626 pointing to the buffer sharing counter 624.

When a buffer, such as buffer 1, 612 is split, if there is no buffer sharing counter 624 for the buffer, one is allocated. An initial value of 2 is set in the allocated BSC 624, and the pointer 626 to the BSC 624 is put in the two buffer descriptors 1, 606 and 4, 622 that point to the shared buffer 1, 612 after the split. If a BSC 624 already exists for a buffer that is split, the counter value is incremented. At any time, the BSC counter value is equal to the number of buffer descriptors pointing at the shared buffer. As each packet is discarded, if a buffer descriptor contains a BSC pointer, the BSC 624 is decremented, and the shared buffer is only discarded if the new value is 0 and the BSC 624 also is deallocated when reaching 0.

Figures 7A, 7B:
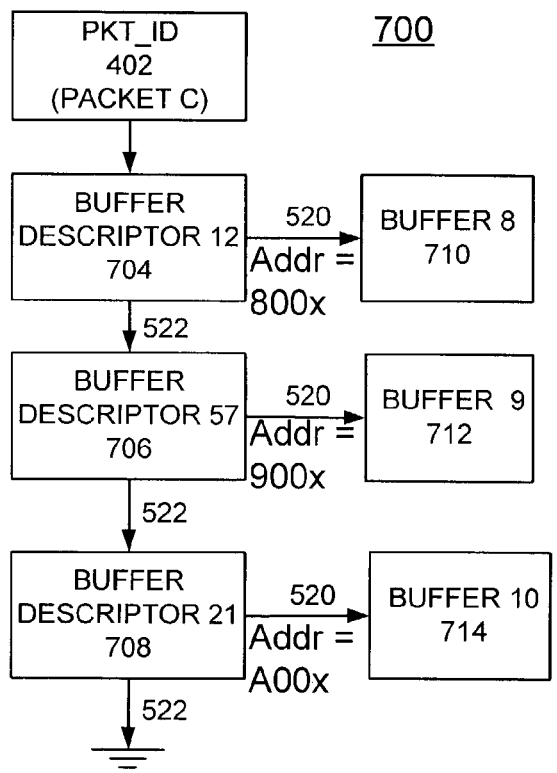
FIG. 7A is a block diagram representation illustrating an exemplary physical packet structure for an example packet in accordance with the preferred embodiment.
FIG. 7B illustrates buffer descriptor entries stored in a buffer descriptor cache for the example packet of FIG. 7A in accordance with the preferred embodiment.

Referring now to FIGS. 7A and 7B, FIG. 7A illustrates an exemplary physical packet structure generally designated by the reference character 700 for an example packet C in accordance with the preferred embodiment. FIG. 7B illustrates buffer descriptor entries for packet C in a buffer descriptor cache generally designated by the reference character 710 for the example packet of FIG. 7A in accordance with the preferred embodiment.

Referring to FIG. 7A, packet C includes a plurality of buffer descriptors 12, 704; 57, 706; 21, 708 each pointing to a respective data buffer 8, 710; 9, 712; 10, 714 indicated at a respective line 520. Each buffer descriptor 12, 704; 57, 706; 21, 708 points to the next buffer descriptor buffers 57, 706; 21, 708; null indicated at respective line 522. A respective buffer address is shown with each pointer 520 in FIG. 7A.

Referring to FIG. 7B, buffer descriptor cache 710 stores each of the buffer descriptors 12, 704; 57, 706; 21, 708 of packet C. The first buffer descriptor 12, 704 includes pointer 520 Addr=800x to the buffer 8, 710, pointer 522, Next=57 to the second buffer descriptor 57, 706, and length 523 to calculate the offset 524 of 256. Buffer descriptor cache 710 includes header information 526, packet ID of packet C, ID=12 and the packet length of packet C, L=479. The packet length L in the header information 526 is read from the PCB. The packet length L in the header information 526 is not used for translates and is read from memory when needed for packet command execution.

The next or second buffer descriptor 57, 706 includes pointer 520 Addr=900x to the buffer 9, 712, length 523 to calculate the offset 524 of 460, and pointer 522, Next=21 to the next buffer descriptor 21, 708. The next or third buffer descriptor 21, 708 includes pointer 520 Addr=A00x to the buffer 10, 714, offset of next 524 of 479, and pointer 522, Next=NULL.

For the example packet C, the length 523 of the first packet data in the first buffer 8, 710 is 256B. The length 523 of the second packet data in the second buffer 9, 712 is 204B, and the length of the third packet data in the third buffer 10, 714 is 19B. The 204B in buffer 9, 712 is less than 256B, for example, possibly packet C originally had a length of 460B and the other 19B were added later.

If a translate offset 320 was desired, compares of the offsets 524 in buffer descriptor cache 710 with the translate offset 320 indicates that translate offset 320 is in the second buffer 9, 712. The target byte for the translate offset 320 is identified by subtracting the starting offset 524 associated with the first buffer descriptor 704 from the desired translate offset 320. The target byte equals 320–256=64 or 40 hex. The identified target byte is added to the starting address 900x to give address 940x and subtracted from the length 523 of 204 of the buffer 9, 712 to give the number of bytes in the buffer starting at address 940x.

Referring now to FIG. 8, an article of manufacture or a computer program product 800 of the invention is illustrated. The computer program product 800 includes a recording medium 802, such as, a floppy disk, a high capacity read only memory in the form of an optically read compact disk or CD-ROM, a tape, a transmission type media such as a digital or analog communications link, or a similar computer program product. Recording medium 802 stores program means 804, 806, 808, 810 on the medium 802 for carrying out the methods for implementing packet work area accesses and buffer sharing of the preferred embodiment in the system 100 of FIG. 1.

A sequence of program instructions or a logical assembly of one or more interrelated modules defined by the recorded program means 804, 806, 808, 810, direct the network processor system 100 for implementing packet work area accesses and buffer sharing of the preferred embodiment.

While the present invention has been described with reference to the details of the embodiments of the invention shown in the drawing, these details are not intended to limit the scope of the invention as claimed in the appended claims.

What is claimed is:

1. A method for implementing packet work area accesses in a network processor system comprising the steps of:
   providing a mapping area including a packet work area and a corresponding set of packet segment registers;
   loading a Packet ID (PID) into one of said packet segment registers;
   mapping packet data for said PID into said corresponding PWA; each packet including one or more data buffers;
   providing a corresponding buffer descriptor for each data buffer for chaining said one or more data buffers of each said packet; each buffer descriptor pointing to the corresponding data buffer and to a next buffer descriptor; and each buffer descriptor including a length of the corresponding data buffer for calculating an offset for a next packet data; and
   comparing a translate address to said calculated offset associated with said one or more data buffers to identify the data buffer containing the translate address.

2. A method for implementing packet work area accesses as recited in claim 1 includes the step of subtracting a starting offset for said identified data buffer containing the translate address from the translate address to identify a target byte.

3. A method for implementing packet work area accesses as recited in claim 1 includes the step of allocating a buffer sharing counter (BSC) for a shared data buffer; said shared data buffer including packet data for at least two of said packets.

4. A method for implementing packet work area accesses as recited in claim 3 includes the step of providing a pointer to the buffer sharing counter (BSC) in each buffer descriptor pointing to the shared data buffer.

5. A method for implementing packet work area accesses as recited in claim 4 includes the steps of discarding a packet having the packet buffer descriptor pointing to the shared data buffer and decrementing a counter value of said BSC.

6. A method for implementing packet work area accesses as recited in claim 5 includes the steps, responsive to a counter value of zero, of discarding the shared data buffer and deallocating said BSC.

7. A method for implementing packet work area accesses as recited in claim 1 includes the step of providing a buffer descriptor cache for storing said packet buffer descriptors; a processor reading or writing a packet control block, and storing predefined packet information in said buffer descriptor cache.

8. A method for implementing packet work area accesses as recited in claim 7 wherein the step of storing predefined packet information includes the steps of storing a packet ID and a packet length of said packet in said buffer descriptor cache; and further includes the steps of manipulating packet data with a packet command, the packet command using said packet length stored in said buffer descriptor cache.

9. Apparatus for implementing packet work area accesses comprising:
   a mapping area including a packet work area and a corresponding set of packet segment registers;
   a packet allocated into one or more buffers; said packet having a packet ID; said packet ID being loaded into one of said packet segment registers;
   a packet translation mechanism for mapping packet data for said packet ID into said corresponding PWA; said packet translation mechanism mapping packet data of each packet into one or more data buffers and providing a corresponding buffer descriptor for each data buffer to chain said one or more data buffers of each said packet; each buffer descriptor including a pointer to the corresponding data buffer and a pointer to a next buffer descriptor; and each buffer descriptor including a length of the corresponding data buffer for calculating an offset for a next packet data; and
   said packet translation mechanism comparing a translate address to said calculated offset associated with said one or more data buffers to identify the data buffer containing the translate address.

10. Apparatus for implementing packet work area accesses as recited in claim 9 wherein said packet translation mechanism subtracts a starting offset for said identified data buffer containing the translate address from the translate address to identify a target byte.

11. Apparatus for implementing packet work area accesses as recited in claim 9 includes a buffer sharing counter (BSC) allocated for a shared data buffer; said shared data buffer including packet data for at least two of said packets.

12. Apparatus for implementing packet work area accesses as recited in claim 11 wherein each buffer descriptor pointing to the shared data buffer includes a pointer to the buffer sharing counter (BSC).

13. Apparatus for implementing packet work area accesses as recited in claim 12 wherein said packet translation mechanism decrements a counter value of said BSC responsive to discarding one of said packets having said packet buffer descriptor pointing to the shared data buffer.

14. Apparatus for implementing packet work area accesses as recited in claim 12 wherein said packet translation mechanism, responsive to said counter value of zero, discards the shared data buffer and said BSC is deallocated.

15. Apparatus for implementing packet work area accesses as recited in claim 9 wherein a buffer descriptor cache stores predefined packet information, said predefined packet information including a packet ID and a packet length of said packet.

16. A computer program product for implementing work area accesses and packet sharing in a network processor system, said computer program product including a plurality of computer executable instructions stored on a computer readable medium, wherein said instructions, when executed by the network processor system, cause the network processor system to perform the steps of:

providing a mapping area including a packet work area and a corresponding set of packet segment registers;

loading a Packet ID (PID) into one of said packet segment registers;

mapping packet data for said PID into said corresponding PWA; each packet including one or more data buffers;

providing a corresponding buffer descriptor for each data buffer to chain said one or more data buffers of each said packet; each buffer descriptor pointing to the corresponding data buffer and to a next buffer descriptor; and each buffer descriptor including a length of the corresponding data buffer for calculating an offset for a next packet data;

allocating a buffer sharing counter (BSC) for a shared data buffer;

said shared data buffer including packet data for at least two of said packets;

providing a pointer to the buffer sharing counter (BSC) in each buffer descriptor pointing to the shared data buffer; and comparing a translate address to said calculated offset associated with said one or more data buffers to identify the data buffer containing the translate address.

17. A computer program product for implementing work area accesses and packet sharing as recited in claim 16 includes the step of subtracting a starting offset for said identified data buffer containing the translate address from the translate address to identify a target byte; said starting offset for said identified data buffer defined by said calculated offset associated with said identified data buffer.

18. A computer program product for implementing work area accesses and packet sharing as recited in claim 16 includes the steps of providing a buffer descriptor cache for storing said buffer descriptors; storing predefined packet information in said buffer descriptor cache; said predefined packet information including a packet ID and a packet length of said packet.

19. A computer program product for implementing work area accesses and packet sharing as recited in claim 16 includes the steps of discarding a packet having the packet buffer descriptor pointing to the shared data buffer and decrementing a counter value of said BSC.

20. A computer program product for implementing work area accesses and packet sharing as recited in claim 19 includes the steps, responsive to a counter value of zero, of discarding the shared data buffer and deallocating said BSC.

* * * * *